(12) United States Patent
Lasso et al.

(10) Patent No.: US 10,038,793 B2
(45) Date of Patent: Jul. 31, 2018

(54) VOIP ADAPTER FOR CONNECTING LANDLINE PHONES TO IP ROUTERS

(71) Applicant: T-Mobile U.S.A., Inc., Bellevue, WA (US)

(72) Inventors: Michael Lasso, Bellevue, WA (US);
Samir Hodroj, Bothell, WA (US);
Della Conley, Bellevue, WA (US);
Omar Hassan, Kirkland, WA (US);
Dragos Lazar, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 74 days.

(21) Appl. No.: 15/269,840

(22) Filed: Sep. 19, 2016

(65) Prior Publication Data
US 2017/0295281 A1 Oct. 12, 2017

Related U.S. Application Data

(60) Provisional application No. 62/319,204, filed on Apr. 6, 2016.

(51) Int. Cl.
*H04M 7/00* (2006.01)
*H04L 29/06* (2006.01)
*H04M 7/06* (2006.01)
*H04M 7/12* (2006.01)

(52) U.S. Cl.
CPC ........ *H04M 7/006* (2013.01); *H04L 65/1006* (2013.01); *H04L 65/1016* (2013.01); *H04M 7/06* (2013.01); *H04M 7/127* (2013.01); *H04M 7/1265* (2013.01)

(58) Field of Classification Search
CPC ... H04M 7/006; H04M 7/127; H04L 65/1006; H04L 65/1016
See application file for complete search history.

(56) References Cited

U.S. PATENT DOCUMENTS

| | | | | |
|---|---|---|---|---|
| 8,369,311 | B1 * | 2/2013 | Kirchhoff | H04M 3/42263 370/352 |
| 2006/0105810 | A1 * | 5/2006 | Gnuschke | H04M 3/42178 455/558 |
| 2008/0244148 | A1 * | 10/2008 | Nix, Jr. | H04L 41/0856 710/313 |
| 2009/0023442 | A1 * | 1/2009 | Ahmed | H04L 63/08 455/426.2 |
| 2010/0029331 | A1 * | 2/2010 | Gnuschke | H04M 3/42178 455/558 |
| 2011/0122810 | A1 * | 5/2011 | Hodroj | H04L 12/2834 370/328 |
| 2011/0125925 | A1 * | 5/2011 | Bouthemy | H04L 12/2834 709/250 |

(Continued)

*Primary Examiner* — Khaled Kassim
*Assistant Examiner* — Syed S Ali
(74) *Attorney, Agent, or Firm* — Perkins Coie LLP

(57) ABSTRACT

Systems and methods for adapting traditional landline telephones to make and receive Voice over Internet Protocol (VoIP) calls and other communications are described. In some embodiments, an adapter, adaptor, or other device or apparatus connects an IP router, such as a WiFi router or other access point, to a traditional landline telephone (e.g., a phone using dual-tone multi-frequency, or DTMF, signaling), enabling the traditional landline phone to make and/or receive VoIP calls.

10 Claims, 6 Drawing Sheets

(56) References Cited

U.S. PATENT DOCUMENTS

| | | | |
|---|---|---|---|
| 2012/0020293 A1* | 1/2012 | Nix, Jr. | H04L 41/0856 370/328 |
| 2015/0065086 A1* | 3/2015 | Linkola | H04W 12/08 455/406 |
| 2015/0341768 A1* | 11/2015 | Dunn | H04M 3/5116 455/404.2 |
| 2017/0257737 A1* | 9/2017 | Dunn | H04M 3/5116 |

* cited by examiner

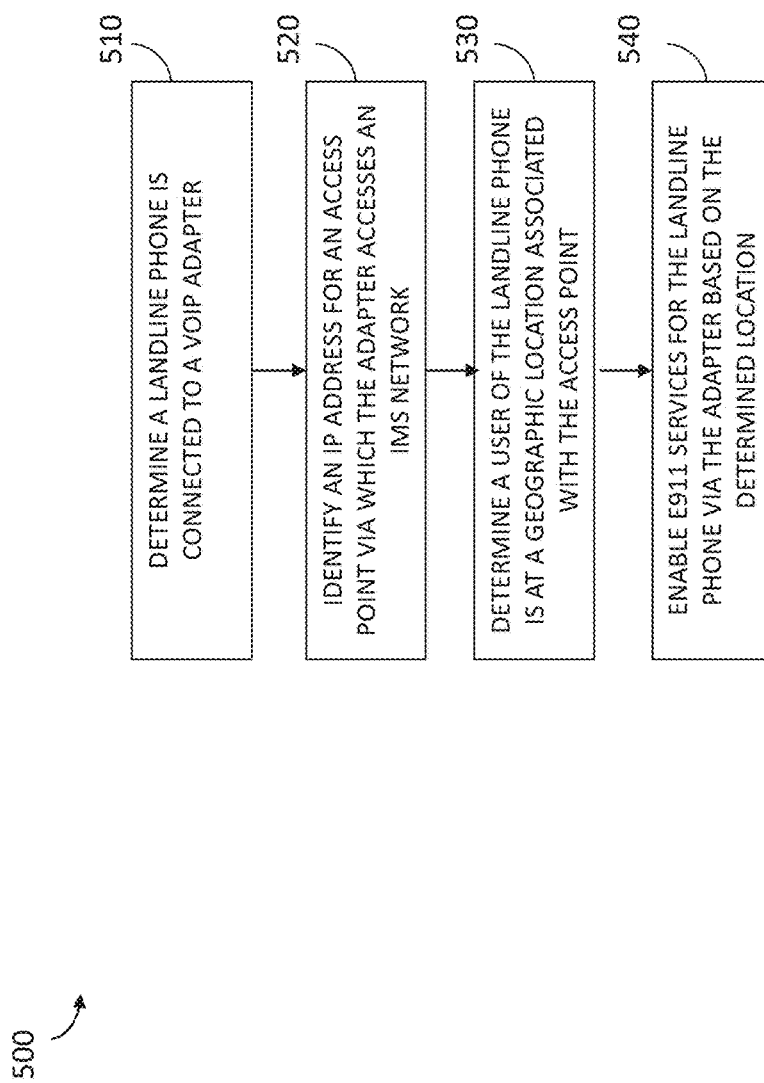

VOIP ADAPTER FOR CONNECTING LANDLINE PHONES TO IP ROUTERS

CROSS REFERENCE TO RELATED APPLICATIONS

This application claims priority to U.S. Provisional Patent Application No. 62/319,204, filed on Apr. 6, 2016, entitled VOIP ADAPTER FOR CONNECTING LANDLINE PHONES TO IP ROUTERS, which is hereby incorporated by reference in its entirety.

BACKGROUND

Conventional Voice Over Internet Protocol (VoIP) systems facilitate the delivery of voice communications and/or multimedia sessions over IP networks, such as the Internet. For example, a conventional VoIP service may provide a user with basic communication services over the Internet, such as voice calls. However, conventional VoIP services are provided without knowledge of a user's location and suffer from various drawbacks as a result. For example, a conventional VoIP service may not provide reliable emergency (E911) services, among other limitations.

BRIEF DESCRIPTION OF THE DRAWINGS

FIG. 5 is a flow diagram illustrating a method for providing E911 services to a user of a landline phone.

DETAILED DESCRIPTION

Figure 1:
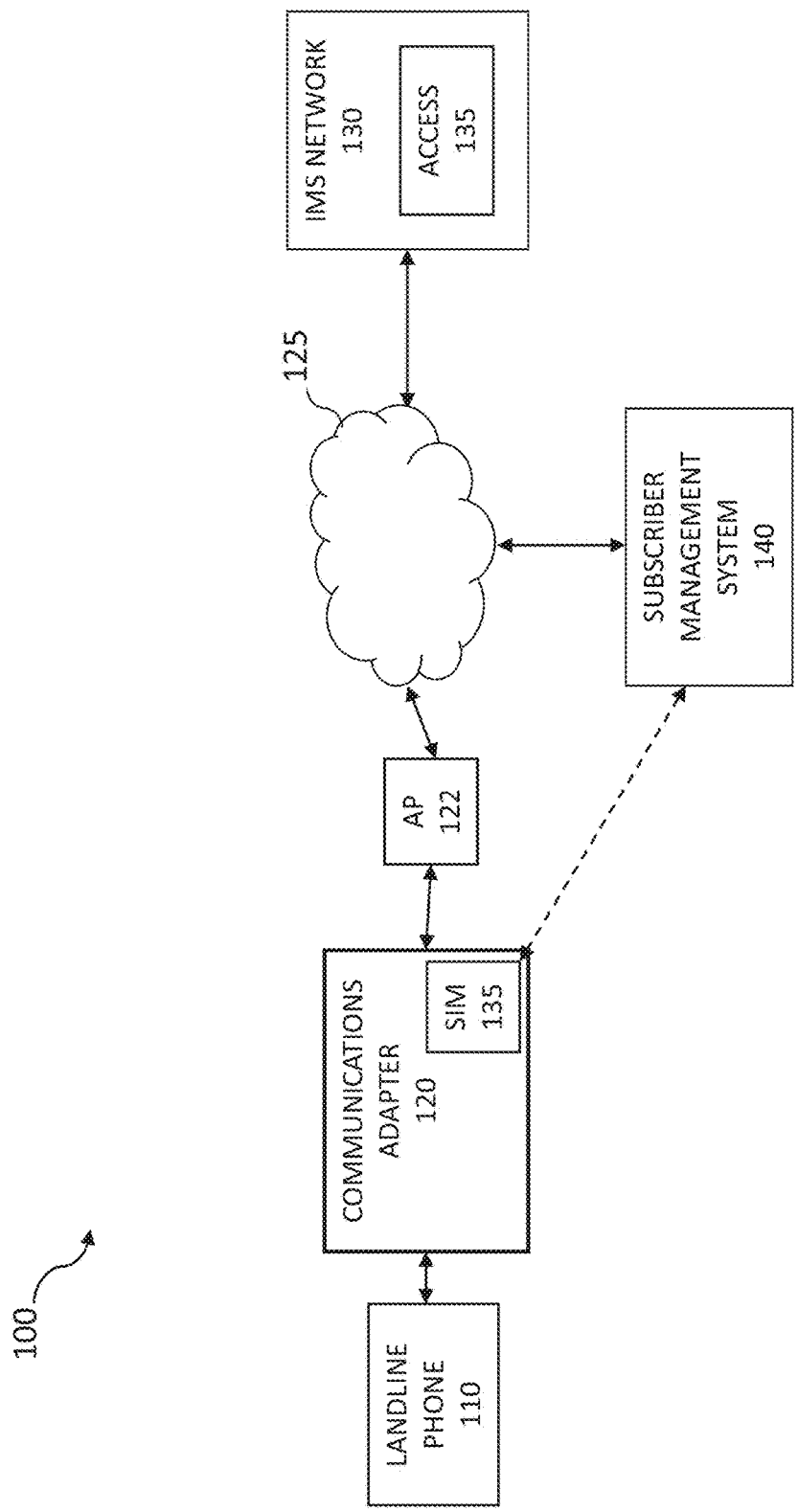
FIG. 1 illustrates aspects of a suitable network environment that facilitates VoIP-based communications between landline telephones and IP-based networks, such as IP Multimedia System (IMS) networks.

Systems and methods for adapting traditional landline telephones to make and receive Voice over Internet Protocol (VoIP) calls and other communications are described. In some embodiments, an adapter, adaptor, or other device or apparatus connects an IP router, such as a WiFi router or other access point, to a traditional landline telephone (e.g., a phone using dual-tone multi-frequency, or DTMF, signaling), enabling the traditional landline phone to make and/or receive VoIP calls.

In some embodiments, the adapter includes a system contained within the adapter for providing voice over internet protocol (VoIP) communication services to a publically-switched telephone network (PSTN) phone, or landline phone, connected to the adapter. The system may include a network communications module that manages communications between the adapter and an IP multimedia system (IMS) network, a phone communications module that translates communications between the connected PSTN phone and the adapter, and/or a subscriber module that facilitates remote management services at the adapter by a telecommunications carrier that provides the IMS network and that includes a user of the adapter as a subscriber of the IMS network.

For example, the adapter may include an RJ-11 connection component, a wireless connection component (e.g., Ethernet and/or universal serial bus (USB) connector that connects the apparatus to an access point associated with the IMS network, a subscriber identity module (SIM) card, and an IMS module configured to manage communications between a landline telephone connected to the apparatus via the RJ-11 connection component and the IMS network.

Such an adapter may provide users of traditional landline phones with various services advanced services previously unavailable from VoIP service providers. For example, the adapter described herein facilitates the integration of remote management services with users that access VoIP services via landline phones, enables the use of E911 protocols by users that access VoIP services via landline phones, and/or supports the provision of rich communication services (RCS) between an accessed IMS network and landline phone users, among other benefits.

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Example Network Configurations

FIG. 1 illustrates aspects of a sample network environment 100 that enables VoIP-based communications between a PSTN landline phone (a phone that employs DTMF signaling) 110, and an IP Multimedia System (IMS) network 130. The network environment 100 includes at least one wireless access point 122. The access point 122 may be public or private, and may be located, for example, in a subscriber's residence (e.g., home, apartment or other residence), in a public location (e.g., coffee shops, retail stores, libraries, or schools) or in corporate or other private locations.

A communications adapter 120, which may include a subscriber identity module (SIM) 135 (e.g., a SIM card), connects the landline phone 110 to the access point 122, which provides access to the IMS network 130 over various communication networks 125, such as wireless networks (Wi-Fi). The IMS network 130 may be provided by a telecommunications carrier, which may include a subscriber management system 140, that acts to manage services and operations provided to subscribers of the IMS network 130. For example, the subscriber management system 140 may communicate with the SIM card 135 of the adapter 120 to facilitate providing remote management services to the adapter 120, among other things.

The access point 122 may employ any type of wireless protocol, including wireless local, wide, and metropolitan area network (WLAN, WWAN, WMAN, respectively)

access protocols. For example, wireless protocols can include IEEE 802.16 (WiMAX), IEEE 802.20 Mobile Broadband Wireless Access (MBWA), Ultra Wideband (UWB), 802.11 wireless fidelity (Wi-Fi), Bluetooth standards, or other similar standards. The access point 122, therefore, may include a wireless router and a broadband modem that enable connection to the Internet Protocol (IP) network 125, which may be one or more public networks, private networks, or combinations of public and private networks.

Furthermore, the communications network 125 may be interfaced with other networks, such as the IMS network 130 via various access gateway servers, such as a Gateway GPRS Support Node (GGSN) for General Packet Radio Service (GPRS), a Packet Data Gateway (PDG) for WiFi, Systems Architecture Evolution Gateway (SAE-GW), a Packet Data Network Gateway (PDN-GW) for 3GPP Long Term Evolution (LTE), and so on.

To ease the integration of the IMS network 130 with Internet resources, various specifications (e.g., 3GPP specifications) use Internet Engineering Task Force protocols within the IMS network 130. An example of one such protocol is session initiation protocol (SIP). SIP is a signaling protocol used for creating, modifying and terminating two-party or multiparty sessions consisting of one or several media streams. Endpoints register with the IMS network 130 in order to use IMS services.

The IMS network 130 includes a Call Session Control Function (CSCF), which provides various SIP servers or proxies for processing signaling packets, performing communication session controls, hosting and executing services, and so on. For example, the IMS network 130 includes a Proxy-CSCF (P-CSCF), which acts a first contact point or gateway 135 for communications from the adapter 120 via the access point 122, a Serving-CSCF, which performs session controls as the central node of the signaling plane of the IMS network, multiple application servers that provide application services, media servers, charging systems, and so on.

The communications adapter 120, on behalf of the landline phone, may act as an endpoint, and register its IP address with a SIP registrar server within the IMS network 130 (e.g., by generating and sending a SIP request message with a "REGISTER" method token). The IMS network 130 handles the authentication. Once registered, the adapter 120 subsequently establishes multimedia sessions, such as VoIP communications, between the landline phone 110 and the IMS network 130.

The communications adapter 120, as described herein, enables a user to access VoLTE and VoWiFi applications (Voice over LTE and Voice over Wi-Fi) provided by the IMS network 130 using a standard landline telephone, such as phone 110. In addition, the adapter 120 enables the IMS network 130 and telecommunications carrier providing the IMS network 130 to provide various functions (e.g., E911, RMS, RCS, and so on), to users of landline telephones that access the IMS network 130.

Examples of the Voice Over Internet Protocol (VoIP) Adapter

The systems and methods described herein provide an adapter, such as adapter 120, or other device or apparatus that connects an IP router, such as a Wi-Fi router, to a traditional landline telephone (e.g., a phone using DTMF signaling), which facilitates and enables the traditional landline phone to make and/or receive VoIP calls via the IMS network 130. The adapter 120 may be, for example, a USB dongle, an RJ-45 apparatus (with micro USB), or other configurations.

Figure 2:
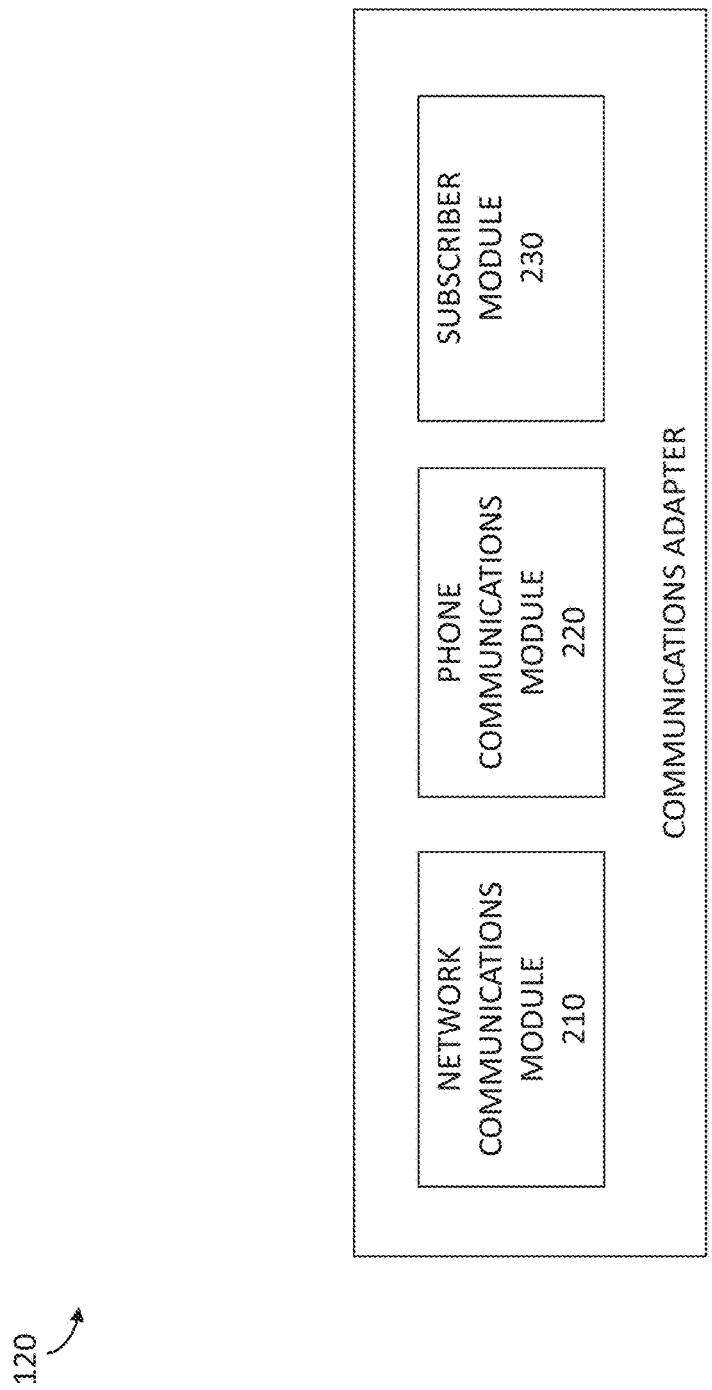
FIG. 2 is a block diagram illustrating components of a system for providing VoIP communications to a landline phone.

FIG. 2 is a block diagram illustrating components of a system 200, contained by the adapter 120, for providing VoIP communications to a landline phone. The system, which is contained within the adapter 120 and provides voice over internet protocol (VoIP) communication services to a publically-switched telephone network (PSTN) phone connected to the adapter 120, may include one or more modules and/or components to perform one or more operations of the adapter 120. The modules may be hardware, software, or a combination of hardware and software, and may be executed by one or more processors. For example, the adapter 120 may include a network communications module 210, a phone communications module 220, and a subscriber module 230.

In some embodiments, the network communications module 210 is configured and/or programmed to manage communications between the adapter 120 and the IP multimedia system (IMS) network 130. For example, the network communications module 210 may include a session initiated protocol (SIP) client that facilitates SIP communications between the adapter 120 and the IMS network 130, as well as an internet protocol security (IPsec) client that provides a secure communication tunnel for the SIP communications between the adapter 120 and the IMS network 130 (via a secure tunnel to directly connect to an ePDG (Evolved Packet Data Gateway) in an EPC through the secure IPSec tunnel).

In some embodiments, the phone communications module 220 is configured and/or programmed to translate communications between a connected PSTN phone, such as phone 110, and the adapter 120. For example, the phone communications module 220 may include a media gateway that translates communications between the network communications module 210, which communicates with the IMS network 130, of the adapter 120 and the connected landline phone 110.

In order to facilitate the translation of communications between the IMS network 130 and the landline phone 110, the phone communications module 220 may include various translation clients, such as clients that translate SS7 protocol information received from the landline phone 110 connected to the adapter via an RJ-11 connection component into SIP protocol information actionable by the IMS network 130, clients that translate SIP protocol information received from the IMS network 130 into SS7 protocol information actionable by the landline phone 110, and so on.

For example, the phone communications module 220 may receive tones input by the landline phone 110 connected to the adapter 120 via an RJ-11 connection component of the adapter 120, and translate the received tones into instructions to be provided to the IMS network 130 via the network communications module 210 (via one or more SIP clients).

The phone communications module 220, therefore, may provide and facilitate various services traditionally provided to PSTN devices, such as dial plan services, speed dial, call hold, call transfer, Call Forward Unconditional (CFU), Call Forward No Reply (CFNRy), Call Forward Busy (CFB), Call Waiting (CW), 3-Way Conference calling, Call ID number and name for outgoing calls, Calling Line Identification Presentation (CLIP) for incoming calls, and so on.

In addition, the phone communications module 220 facilitates the use of star codes by the connected landline phone 110. Example star codes and associated actions/functions include:

| Description | RJ11 Dial Sequence | GSM Dial Sequence |
|---|---|---|
| Operator Call N11 Services | | |
| Directory | 411 | 411 |
| Traffic information | 511 | 511 |
| Customer Care | 611 | 611 |
| Telecommunications Relay Services | 711 | 711 |
| Emergency | 911 | 911 |
| Local, Long Distance, and International Calls | | |
| US Local Number | NXX-XXXX | NXX-XXXX switch will assume NPA is equal to subscriber's NPA |
| North American | NPA-NXX-XXXX | NPA-NXX-XXXX |
| Long Distance | 1-NPA-NXX-XXXX | 1-NPA-NXX-XXXX |
| International | 011 + Country Code + City Code + Local Number | "+" + Country Code + City Code + Local Number |
| Call Forwarding Unconditional (CFU) | | |
| Activate CFU | *72DN | *21*DN# |
| Deactivate & Erase CFU | *73 | ##21# |
| Default Destination # | No default | No default |
| Call Forward No Reply Conditional (CFNRy) | | |
| Default Status | Call forwarded to Voicemail | Voice Mail # |
| Activate CFNRy | *42DN | *61*DN# |
| Deactivate & Erase CFNRy | *93 | ##61# |
| Call Forward Busy Conditional (CFB) | | |
| Default Status | Call forwarded to Voicemail | Voice Mail # |
| Activate CFB | *40DN | *67*DN# |
| Deactivate & Erase CFB | *91 | ##67# |
| Call Waiting (CW) | | |
| Activate CW | Not applicable | *43# |
| Deactivate CW | *70Called Number | #43# |
| Calling Line Identification Restriction (CLIR) for Outgoing Call | | |
| Activate CLIR | *67DN | #31#DN# |
| Deactivate CLIR | *82DN | *31#DN# |
| Calling Line Identification Presentation (CLIP) for Incoming Call | | |
| Activate CLIP | *65 | *30# - Does not work |
| Deactivate CLIP | *85 | #30# - Does not work |

Further, the phone communications module 220 facilitates the use of various supplemental service codes, such as:

| Description | RJ-11 Dial Sequence | GSM Dial Sequence |
|---|---|---|
| Supplemental Call Features | | |
| Repeat Dialing | *66 | None |
| Cancel repeat Dialing | *86 | None |
| Activate Call Screening | *60 | None |
| Deactivate Call Screening | *80 | None |
| Call Restrictions | Via UI | None |
| Activate Anonymous Call Rejection | *77 | None |
| Deactivate Anonymous Call Rejection | *87 | None |
| Call Transfer | *99 | None |
| Activate Call Forward Not Reachable | *62* DN # | *62* DN # |
| Deactivate Call Forward Not Reachable | ##62# | ##62# |
| Select Caller Tune | *8863 (*TUNE) | *8863 (*TUNE) |
| Call Last Number | *69 | None |

As described herein, the phone communications module 220 may cause various audible notifications to be presented to users of landline phones 110. For example, the phone communications module 220 may present the following notifications:

Upon initial activation, a notification of: "Congratulations, your phone is now ready to be used," followed by a dial tone;

When there is a missing 911 address or location (which is described in detail herein), a notification of: "We seem to be missing a 911 address for emergency purposes in your line. Please contact customer care to update your information";

When there is no data connection detected, a notification of: "We seem to be having issues connecting to the network. Please ensure your device is properly connected to a data port and reboot your device"; and so on.

In some embodiments, the subscriber module 230 is configured and/or programmed to facilitate remote management services of the adapter 120 by a telecommunications carrier that provides the IMS network 130 and that includes a user of the adapter 120 as a subscriber of the IMS network 130. For example, the subscriber module may include or be integrated with a subscriber identity module (SIM) card that facilitates remote management of the adapter 120.

The SIM card provides the adapter 120 with a securely stored international mobile subscriber identity (IMSI) number and related key, Therefore, a telecommunications carrier providing the IMS network 130 may identify, authenticate, and/or authorize subscribers and other users that are accessing the IMS network 130 for voice communications using landline phones 110.

Figure 3A:
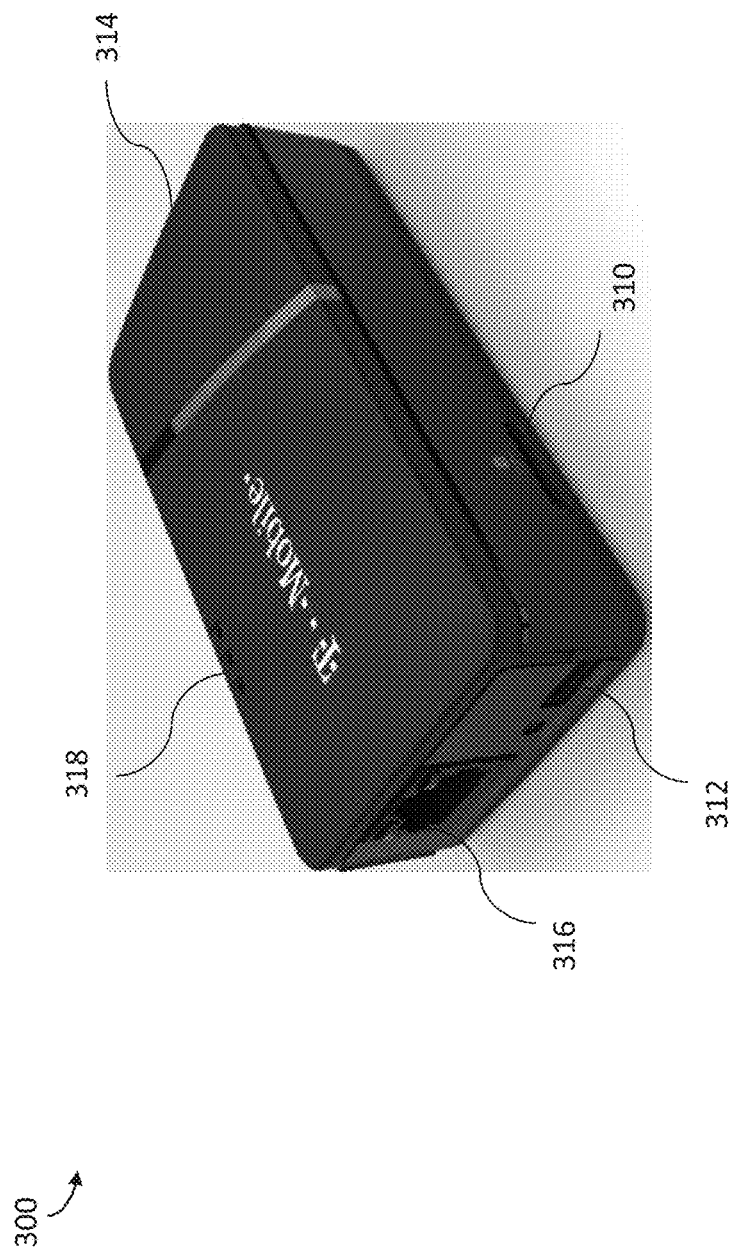
FIGS. 3A-3B are diagrams illustrating various VoIP adapter configurations.
Figure 3B:
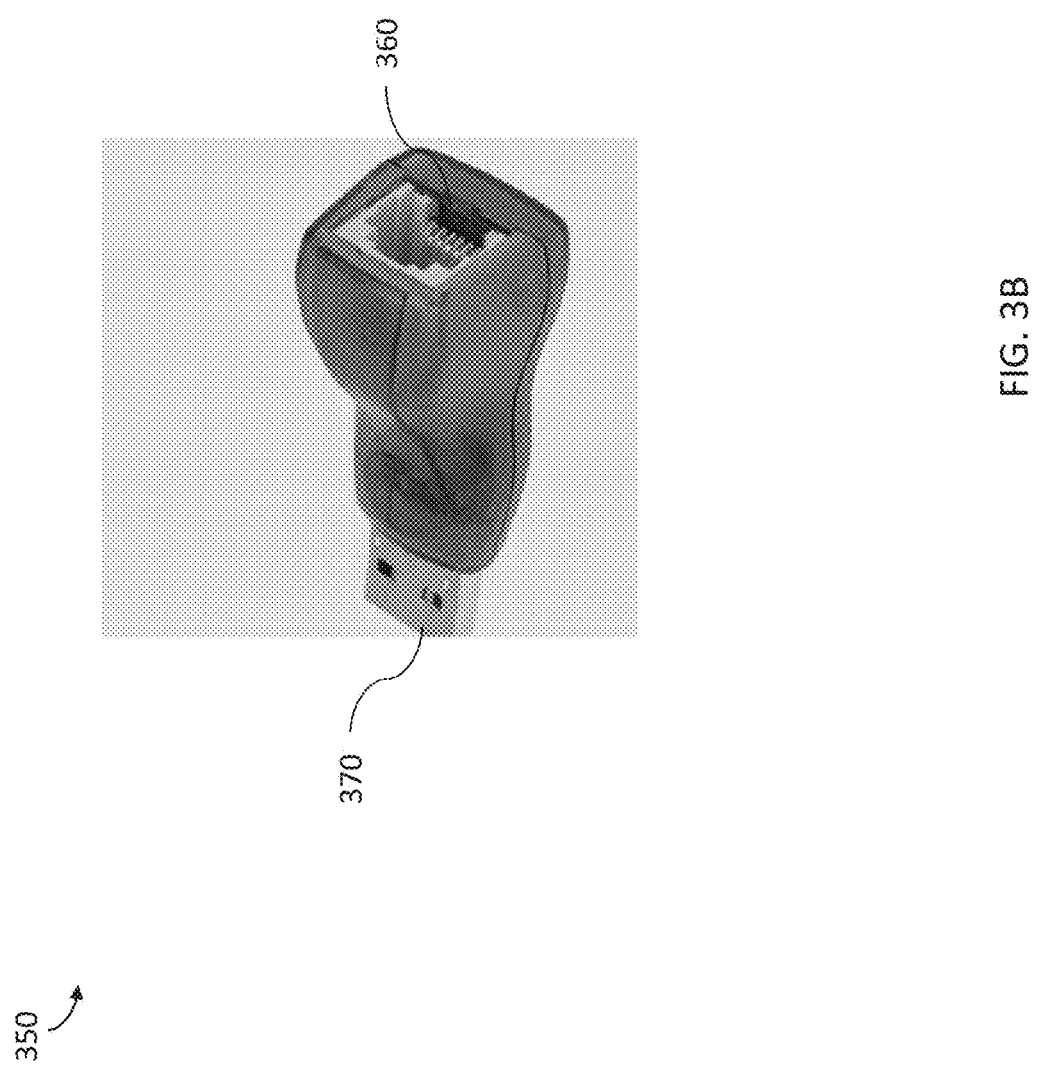

As described herein, the adapter 120 may be designed in a variety of configurations suitable for different implementations and/or use cases. FIGS. 3A-3B are diagrams illustrating various VoIP adapter configurations.

FIG. 3A depicts an adapter 300 as a stand-alone adapter that includes a SIM card slot 310 for reception of a SIM card, a USB connector or port 312 for providing power and/or data to the adapter 300, an RJ-11 connector or port 314 for connecting a landline phone to the adapter 300, a LAN or Ethernet connector (e.g., RJ-45) or port 314 for connecting the adapter 300 to an IP router or other access point, and one or more indicator lights (e.g., LEDs) for providing visual displays of status and other information. The adapter 300 may also include other components, such as display screens (e.g., touch screens) other data or power connection components, and so on.

FIG. 3B depicts a simplified configuration of an adapter 350, such as an adapter having a dongle or other similar configuration. The adapter 350 includes an RJ-11 connector or port 360 for connecting a landline phone to the adapter 350 and a USB connector or port 312 configured to connect the adapter 350 to a USB port of a wireless router in order to provide power and data (e.g., from the IMS network 130) from the router to the adapter 350.

Of course, the adapter, and various components or modules (e.g., modules 210-230) may be incorporated in a variety of other configurations. For example, an IP router, such as access point 122, may include some or all of the system described herein, in order to directly provide IMS network 130 services to landline phones that connect directly to the router via a provided RJ-11 port or other similar connection mechanism.

Thus, the adapter 120 may be configured to be easily implemented by a customer or subscriber. For example, to use the adapter 120, the customer may plug the adapter 120 into an Ethernet port of a router and into a power outlet.

Once the adapter 120 is provisioned on a network, the customer plugs in a home phone into an RJ-11 port of the adapter 120 and listens for a dial tone. The customer places a phone call via the adapter 120, and at a later time, may review a new line of service for the adapter 120. A network provider may maintain call logs and call durations for the customer, which may be accessible through a customer service website, such as an interface provided by the subscriber management system 140.

As described herein, various aspects of the adapter 120 enable landline phones, such as phone 110, to utilize computing functions and services normally provided to IMS configured devices, such as mobile devices, laptops, and so on. Therefore, unlike conventional VoIP-enabled devices, the adapter 120, via an integrated IMS stack and/or SIM card, enables a telecommunications carrier, via the subscriber management system 140, to add an additional line to a subscriber's communications plan (via the adapter 120). Further, the adapter 120 performs E911 services for users of landline phones, and facilitates remote management of the landline phones, as well as provisions rich communication services to users, among other things.

Figure 4:
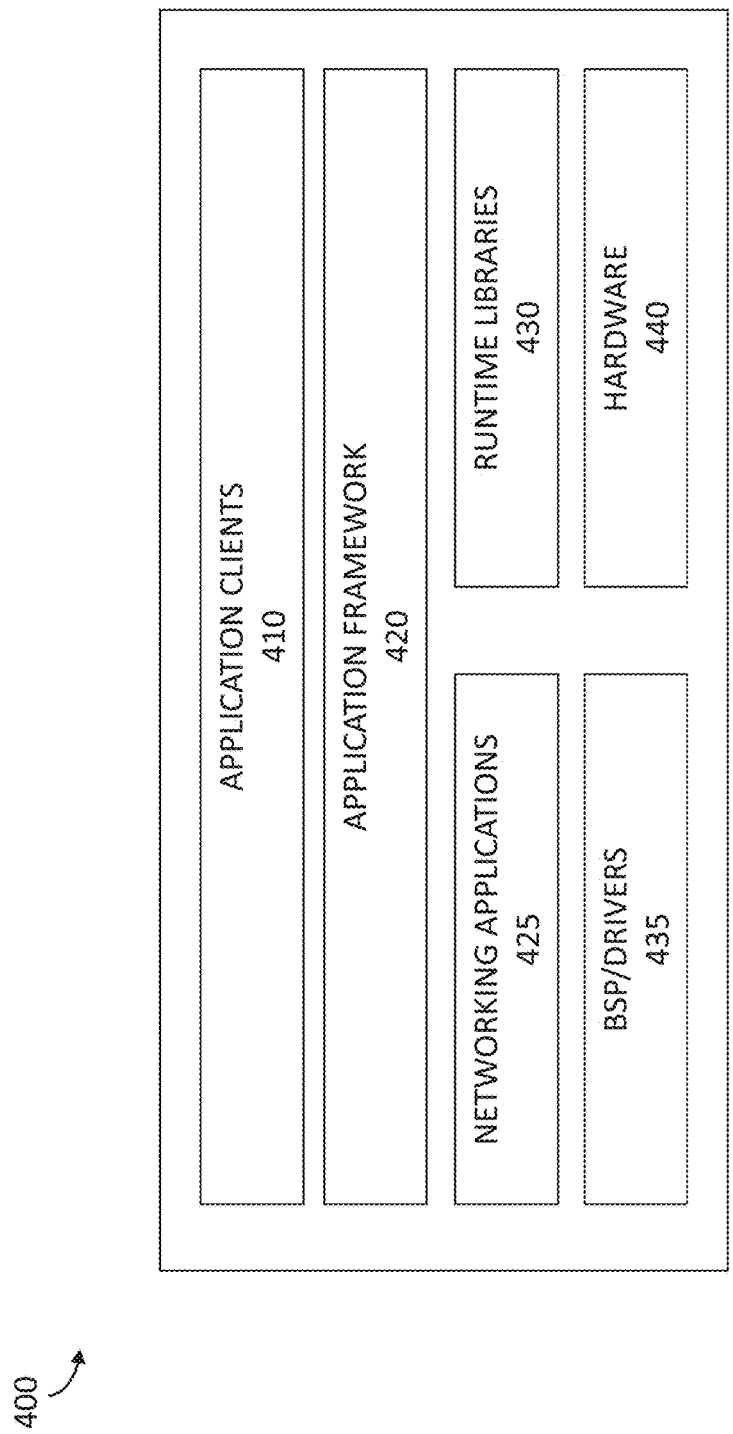
FIG. 4 is a block diagram illustrating an example computing environment that facilitates VoIP communications between a landline phone and an IP Multimedia System (IMS) network.

FIG. 4 is a block diagram illustrating an example computing environment 400 that facilitates VoIP communications between a landline phone and an IP Multimedia System (IMS) network.

The computing environment 400 includes one or more application clients 410, such as a session initiated protocol (SIP) client that facilitates SIP communications between the adapter 120 and the IMS network 130, as well as an internet protocol security (IPsec) client that provides a secure communication tunnel for the SIP communications between the adapter 120 and the IMS network 130. Further, the environment 400 includes an application framework 420, such as various controllers and/or API/scripts, various network applications 425, runtime libraries 430, a broad support package (BSP) and drivers 435, and hardware interfaces 440, such as interfaces for a SIM reader, the USB port, and so on.

As described herein, the adapter 120 provides various functions and/or configurations, including: plug and play operation, reliable remote management capabilities, compatibility with Wi-Fi routers, stand-alone operation (e.g., no additional network infrastructure or software needed for deployment), and so on.

In some embodiments, the systems and methods described herein provide a VoIP adapter 120 or device capable of performing some or all of the following setup and operation functions, and/or including some or all of the following capabilities or characteristics.

When the adapter 120 is connected to a router during setup, a user is able to plug a cordless or landline phone into an RJ-11 port. The adapter 120 will automatically register with the IMS network 130, and a dial tone is heard on the cordless phone.

When the adapter is not able to register because of a registration problem, the cordless phone may not have a dial tone and the adapter may display an indication of an error (e.g., a red LED) and/or present an audible voice notification through the auricular of the connected RJ-11 port, as described herein.

As described herein, the systems and method enable various services to be provided to users of landline phones that perform VoIP communications with the IMS network 130, such as E911 services. FIG. 5 is a flow diagram illustrating a method 500 for providing E911 services to a user of a landline phone. The method 500 may be performed by the adapter 120 and, accordingly, is described herein merely by way of reference thereto. It will be appreciated that the method 500 may be performed on any suitable hardware.

In operation 510, the adapter 120 determines that a PSTN phone is connected to a voice over internet protocol (VoIP) adapter, wherein the adapter is configured to translate communications between the PSTN phone and an IP Multimedia System (IMS) network accessed by the adapter.

In operation 520, the adapter 120 identifies an IP address for an access point (AP) via which the adapter accessed the IMS network. In operation 530, the adapter 120 determines a user of the PSTN phone is at a geographical location associated with the identified IP address or has provided an address via the subscriber management system 140.

In operation 540, the adapter 120 enables E911 communications for the PSTN phone over the IMS network via the adapter 120 based on the determined geographical location for the user. In some cases, when the geographical location of the user is determined to be ambiguous or unknown, the adapter, via the phone communications module 220, may notify a user of the PSTN phone that the geographical location of the user is ambiguous or unknown by causing the PSTN phone to play tones to the user that indicate the unknown geographical location, by causing the PSTN phone to play an audio sequence (as described herein) to the user that indicate the unknown geographical location, by causing the phone to display a visual indicator associated with the unknown geographical location, and so on.

Thus, in some embodiments, the adapter 120 described herein enables a landline phone to function as an IMS or IP enabled device on an IMS network, among other benefits.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively or additionally, network elements performing those functions could be replaced by two or more elements to perform portions of those functions. In addition, while processes, message/data flows, or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

The teachings of the methods and system provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

What is claimed is:

1. An apparatus for connecting a landline telephone to an IP Multimedia Subsystem (IMS) network, the apparatus comprising:
   an RJ-11 connector;
   a wireless connection component that connects the apparatus to an access point associated with the IMS network;
   a subscriber identity module (SIM) card;
   an IMS module, coupled among the RJ-11 connector, the wireless connection component and the SIM card, and configured to manage communications between a landline telephone connected to the apparatus via the RJ-11 connector and the IMS network,
      wherein the IMS module includes a session internet protocol (SIP) client that facilitates SIP communications between the apparatus and the IMS network and an internet protocol security (IPsec) client that provides a secure communication tunnel for the SIP communications between the apparatus and the IMS network; and
   a landline telephone communications module having a media gateway that translates communications between the IMS module of the apparatus and the landline telephone, including:
      translating SS7 protocol information received from the landline telephone connected to the apparatus via the RJ-11 connector into SIP protocol information actionable by the IMS module; and
      translating SIP protocol information received from the IMS module into SS7 protocol information actionable by the landline telephone.

2. The apparatus of claim 1, wherein the landline telephone communications module manages communications between the IMS network and a publicly-switched telephone network (PSTN) telephone.

3. The apparatus of claim 1, wherein the landline telephone communications module receives tones input by a publicly-switched telephone network (PSTN) telephone connected to the apparatus via the RJ-11 connector and translates the received tones into instructions to be provided to the IMS network via the IMS module.

4. The apparatus of claim 1, further comprising:
   a universal serial bus (USB) connector configured to connect the apparatus to the access point to provide power to the apparatus via the access point.

5. The apparatus of claim 1, wherein the wireless connection component is an Ethernet connector configured to connect the apparatus to the access point.

6. The apparatus of claim 1, wherein the subscriber identity module (SIM) card facilitates remote management services of the apparatus by a telecommunications carrier that provides the IMS network and that includes a user of the apparatus as a subscriber of the IMS network.

7. The apparatus of claim 1, further comprising:
   a USB connector configured to connect the apparatus to a USB port of a wireless router.

8. A system, comprising:
   at least one hardware processor;
   at least one hardware memory coupled to the at least one hardware processor, wherein the at least one memory stores modules executed by the at least one hardware processor, wherein the modules include:
      an IMS module, coupled to a RJ-11 connection and a SIM card of an adapter, that manages communications between a landline telephone connected to the apparatus via the RJ-11 connection and an IP Multimedia Subsystem (IMS) network,
         wherein the IMS module includes a session internet protocol (SIP) client that facilitates SIP communications between the apparatus and the IMS network and an internet protocol security (IPsec) client that provides a secure communication tunnel for the SIP communications between the apparatus and the IMS network; and a landline telephone communications module having a media gateway that translates communications between the IMS module of the apparatus and the landline telephone, by:

translating SS7 protocol information received from the landline telephone connected to the apparatus via the RJ-11 connector into SIP protocol information actionable by the IMS module; and translating SIP protocol information received from the IMS module into SS7 protocol information actionable by the landline telephone.

9. The system of claim 8, wherein the landline telephone communications module manages communications between the IMS network and a publicly-switched telephone network (PSTN) telephone.

10. The system of claim 1, wherein the landline telephone communications module receives tones input by a publicly-switched telephone network (PSTN) telephone connected to the apparatus via the RJ-11 connector and translates the received tones into instructions to be provided to the IMS network via the IMS module.

* * * * *